(12) United States Patent
Noh et al.

(10) Patent No.: US 8,054,520 B2
(45) Date of Patent: Nov. 8, 2011

(54) SPACE SCANNER FOR AUTONOMOUS MOBILE DEVICE

(75) Inventors: Jung Eun Noh, Gyunggi-do (KR); Dong Ik Shin, Gyunggi-do (KR); Back Kue Lee, Gyunggi-do (KR); Hong Ki Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 278 days.

(21) Appl. No.: 12/422,687

(22) Filed: Apr. 13, 2009

(65) Prior Publication Data

US 2010/0073749 A1 Mar. 25, 2010

(30) Foreign Application Priority Data

Sep. 23, 2008 (KR) ........................ 10-2008-0093407

(51) Int. Cl.
*G02B 26/08* (2006.01)

(52) U.S. Cl. ..................................................... 359/200.1
(58) Field of Classification Search .... 359/198.1–200.4, 359/871, 872
See application file for complete search history.

(56) References Cited

U.S. PATENT DOCUMENTS 4,499,490 A * 2/1985 Morgan .......................... 348/37

FOREIGN PATENT DOCUMENTS

JP 10-020035 1/1998

* cited by examiner

*Primary Examiner* — Euncha Cherry
(74) *Attorney, Agent, or Firm* — McDermott Will & Emery LLP (57) ABSTRACT

A space scanner for an autonomous mobile device can obtain spatial data by scanning not only in the horizontal direction but also in the vertical direction of the mobile device using a mirror configured to rotate as well as to tilt and thereby can ensure autonomous driving.

10 Claims, 7 Drawing Sheets

SPACE SCANNER FOR AUTONOMOUS MOBILE DEVICE

CROSS-REFERENCE TO RELATED APPLICATIONS

This application claims under 35 U.S.C. §119(a) the benefit of Korean Patent Application No. 2008-93407 filed on Sep. 23, 2008, in the Korean Intellectual Property Office, the disclosure of which is incorporated herein by reference in its entirety.

BACKGROUND OF THE INVENTION

1. Field of the Invention

The present invention relates to a space scanner for an autonomous mobile device, more particularly, which can obtain spatial data by scanning not only in the horizontal direction but also in the vertical direction of the mobile device using a mirror configured to rotate as well as to tilt.

2. Description of the Related Art

An autonomous mobile (walking) device such as a mobile robot detects surrounding objects and measures distances from the objects using laser, supersonic waves or the like in order to locate its position and determine the direction to move.

Laser range finding is known as a most accurate method for measuring the distance to an object, particularly, by detecting a laser beam reflecting from the object and measuring the time taken for the laser beam to travel to the object and back.

A conventional autonomous mobile device adopting such a laser range finding technique scans using laser beams emitted directly along a two-dimensional horizontal plane. Accordingly, the autonomous mobile device can detect surrounding objects and measure the distance from the objects only if the objects are located at a specific height corresponding to a laser emitter.

That is, detectable objects are limited to those onto which the laser beams are emitted and to those which are located at the same horizontal plane of the laser emitter. Thus, it is impossible to scan other ranges and distance information on only a specific horizontal plane can be obtained.

However, while consumer demands on autonomous mobile devices capable of performing more accurate driving and more various operations are increasing, the distance information only on a specific horizontal plane cannot sufficiently ensure safety and functionality.

SUMMARY OF THE INVENTION

An aspect of the present invention provides a space scanner for an autonomous mobile device, which can obtain spatial data necessary for autonomous driving by scanning not only in the horizontal direction but also in the vertical direction of the mobile device using a mirror configured to rotate as well as to tilt.

According to an aspect of the present invention, the space scanner for an autonomous mobile device may include a rotation driving unit; a mirror coupled with the rotation driving unit so as to tilt with respect thereto; a gear unit converting the direction of a rotating force from the rotation driving unit; a cam member coupled with the gear unit via a shaft on which the cam member is mounted, the cam member rotating by the rotating force transmitted via the gear unit; and a tilt driving unit having an underside surface performing surface contact with the cam member, wherein the tilt driving unit vertically reciprocates by rotation of the cam member to tilt the mirror.

In an exemplary embodiment, the rotation driving unit may include a rotary electric motor; and a vertical rotary shaft having one end axially coupled with the rotary electric motor and the other end hinged to the mirror.

In another exemplary embodiment, the gear unit may include a first gear rotating by the rotating force from the rotation driving unit; and at least one second gear meshed with the first gear to rotate on a horizontal rotary shaft, which extends perpendicular to a vertical center of rotation of the first gear.

In a further exemplary embodiment, the gear unit may further include at least one support through which the horizontal rotary shaft extends, wherein the support is coupled with the horizontal rotary shaft to allow the second gear to rotate in mesh with the first gear.

In a further another exemplary embodiment, the horizontal rotary shaft has one end connected to the second gear and the other end connected to the cam member, and is supported by the support.

In another exemplary embodiment, the gear unit may include bevel gears.

In a further exemplary embodiment, the cam member has a circular or elliptical shape.

In another exemplary embodiment, the cam member is shaft-connected with the gear unit such that the center of rotation is eccentric to the center of the cam member.

In a further exemplary embodiment, the tilt driving unit may include a vertically movable frame driven to vertically reciprocate by the cam member, which is placed under the vertically movable frame, wherein the vertically movable frame has a central opening of a predetermined size in the central portion thereof; a rotary frame having a through-hole of a predetermined size that allows the gear unit to pass through, wherein the rotary frame is received inside the central opening and is rotatably coupled with the vertically movable frame; and a rod having one end hinged to the rotary frame and the other end hinged to the mirror.

In a further another exemplary embodiment, the tilt driving unit further includes a guide shaft guiding the vertically movable frame to vertically reciprocate.

According to embodiments of the invention, the space scanner for an autonomous mobile device can obtain spatial data necessary by scanning not only in the horizontal direction but also in the vertical direction of the mobile device using a mirror configured to rotate as well as to tilt, and thereby ensure more precise and safe autonomous driving.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

A space scanner for an autonomous mobile device according to the present invention will now be described hereinafter more fully with reference to the accompanying drawings, in which exemplary embodiments thereof are shown.

Figure 1:
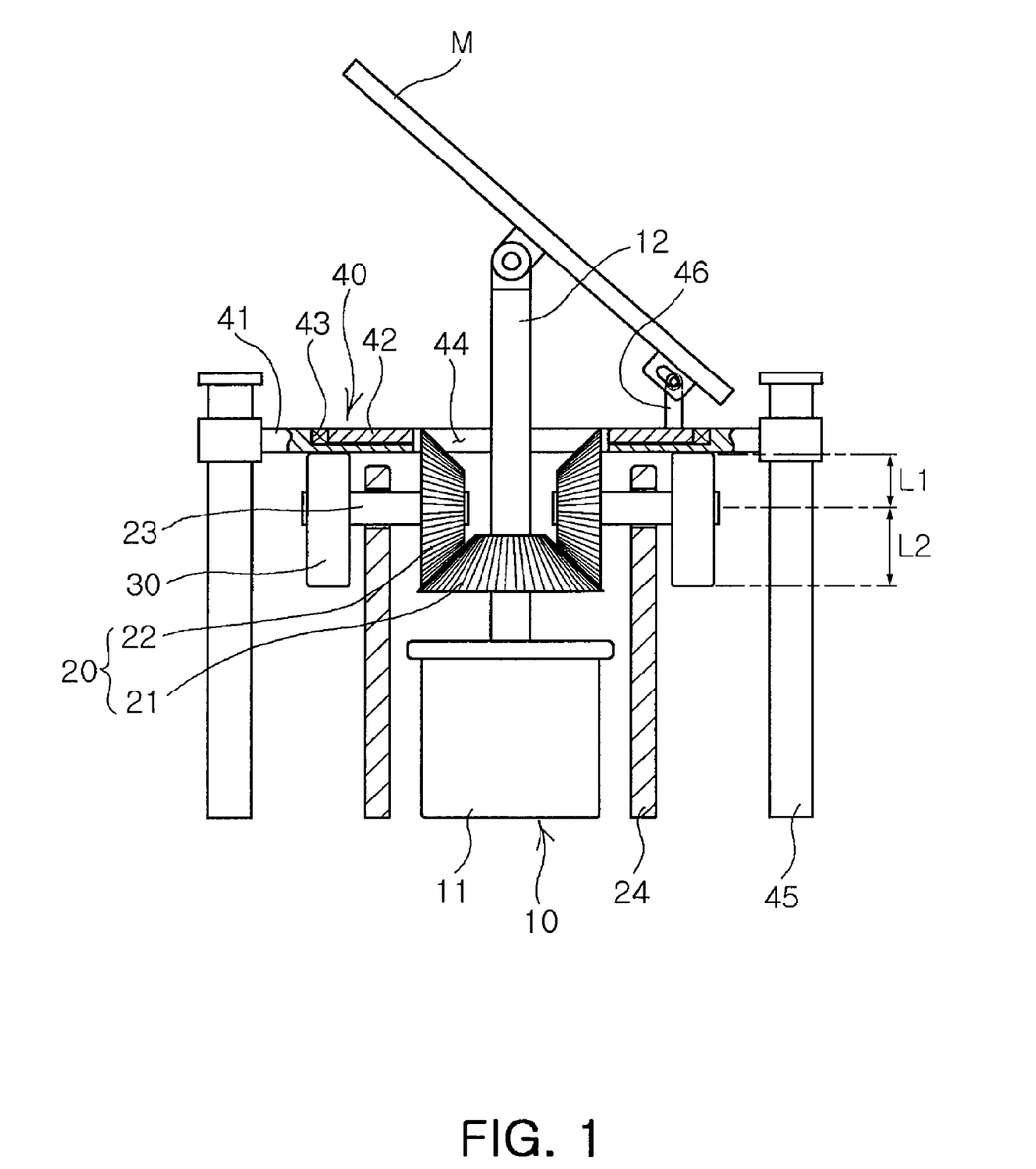
FIG. 1 is a cross-sectional view illustrating a space scanner for an autonomous mobile device according to an exemplary embodiment of the invention.
Figure 2:
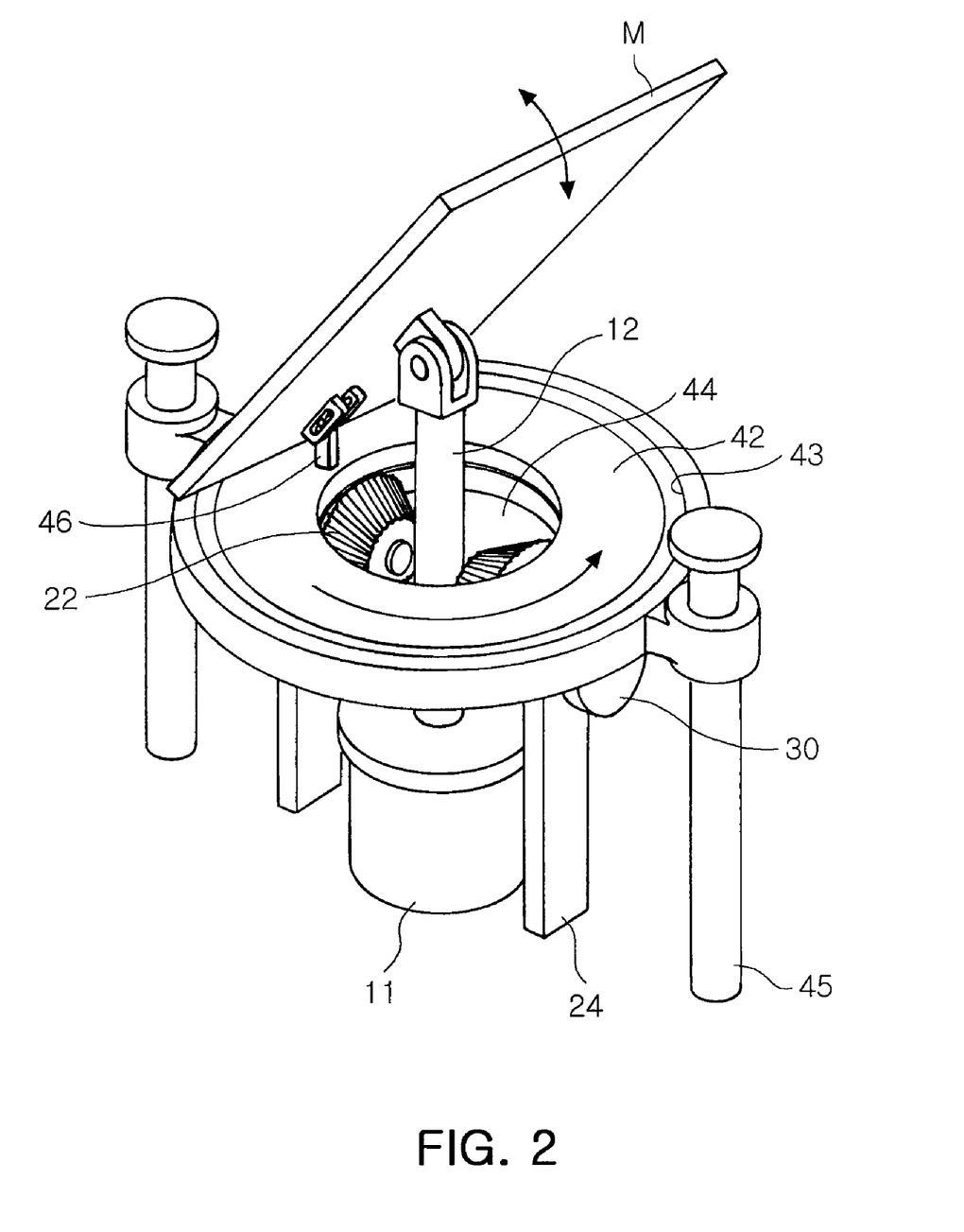
FIG. 2 is a perspective view of the space scanner for an autonomous mobile device shown in FIG. 1.
Figure 3:
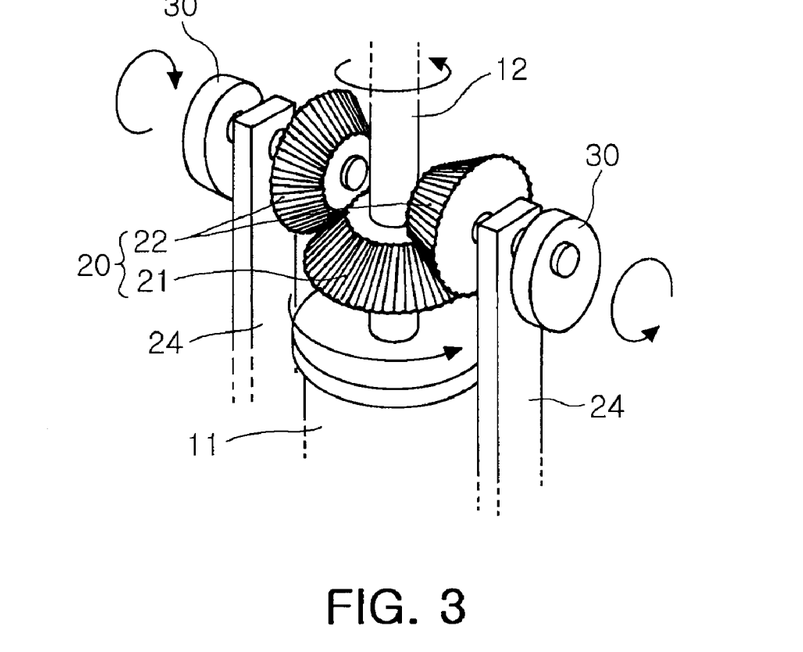
FIG. 3 is a perspective view illustrating a gear unit of the space scanner for an autonomous mobile device shown in FIG. 1.
Figure 4:
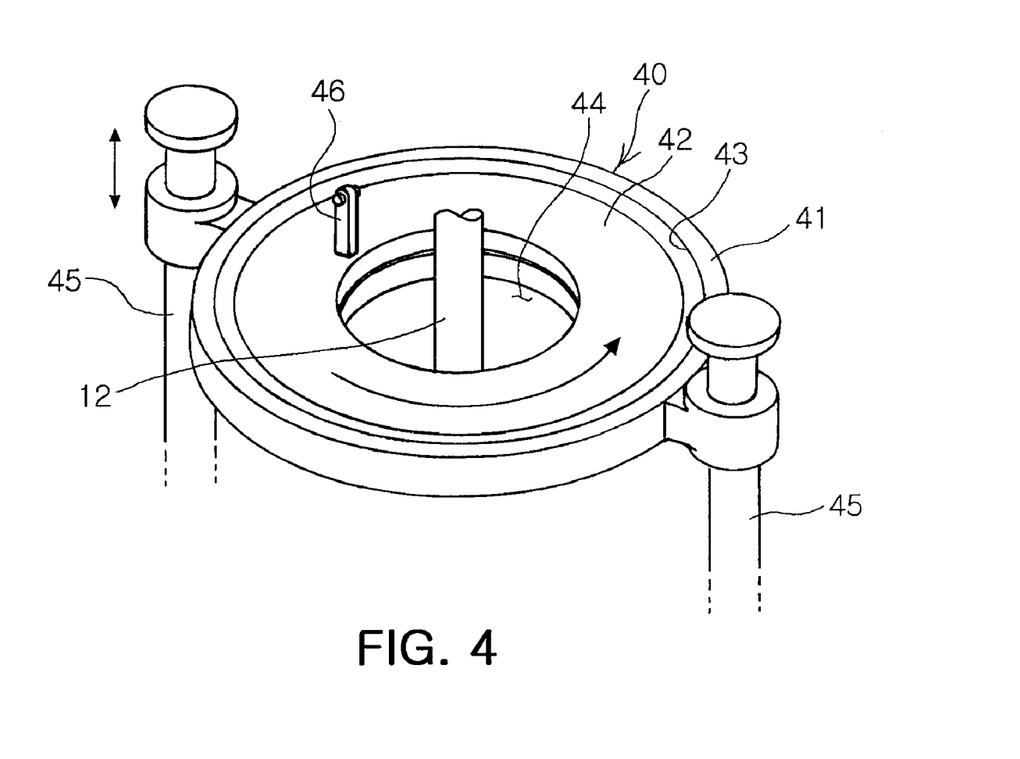
FIG. 4 is a perspective view illustrating a tilt driving unit of the space scanner for an autonomous mobile device shown in FIG. 1.
Figure 5:
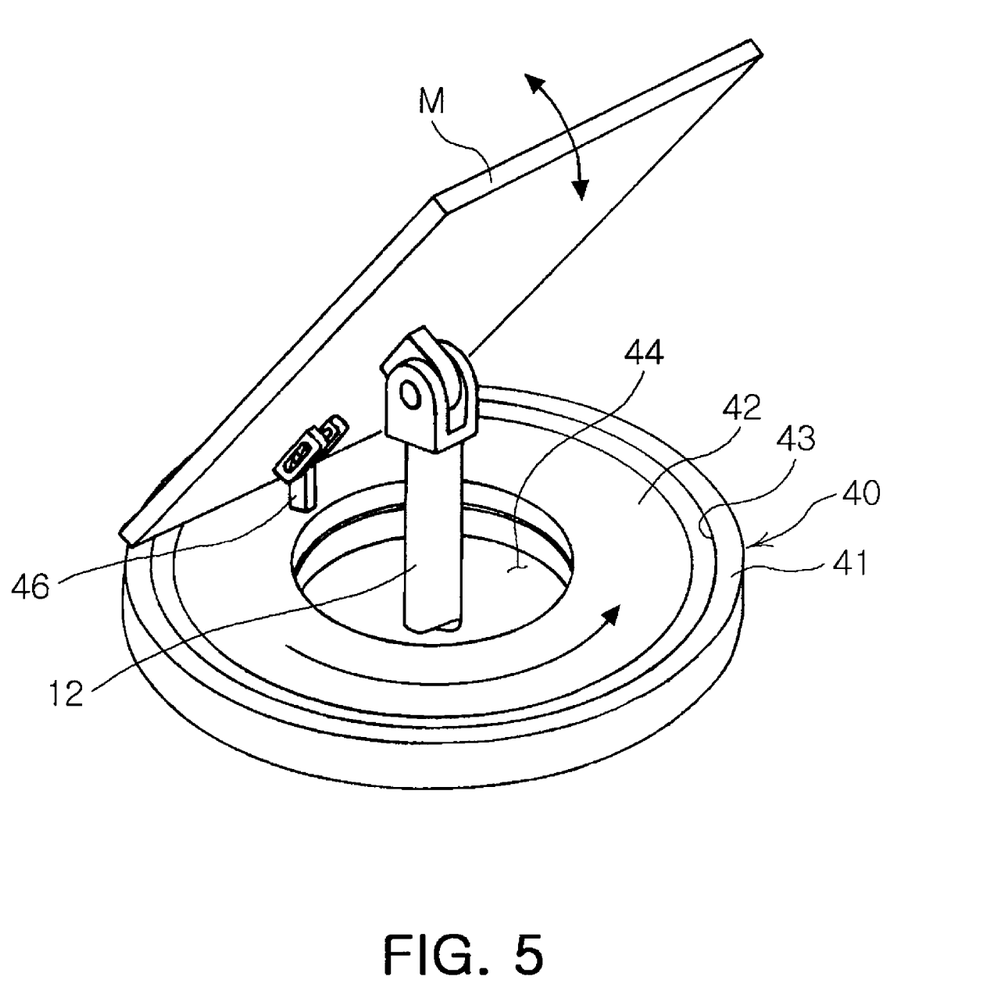
FIG. 5 is a perspective view illustrating tilt driving unit shown in FIG. 4, to which a mirror is hinged.

FIG. 1 is a cross-sectional view illustrating a space scanner for an autonomous mobile device according to an exemplary embodiment of the invention, FIG. 2 is a perspective view of the space scanner for an autonomous mobile device shown in FIG. 1, FIG. 3 is a perspective view illustrating a gear unit of the space scanner for an autonomous mobile device shown in FIG. 1, FIG. 4 is a perspective view illustrating a tilt driving unit of the space scanner for an autonomous mobile device shown in FIG. 1, and FIG. 5 is a perspective view illustrating tilt driving unit shown in FIG. 4, to which a mirror is hinged.

As shown in FIGS. 1 and 2, the space scanner for an autonomous mobile device according to an exemplary embodiment of the invention includes a rotation driving unit 10, a mirror M, a gear unit 20, cam members 30 and a tilt driving unit 40.

The rotation driving unit 10 serves to generate a rotating force for driving the space scanner for an autonomous mobile device of the invention. The rotation driving unit 10 has a rotary motor 11 provided in the lower portion thereof to rotate a vertical rotary shaft 12 when electric power is applied thereto. The rotary motor 11 can preferably be contained in a housing to be protected from outside.

The vertical rotary shaft 12 has a circular columnar structure to be rotated at a predetermined rate by the rotary motor 11, wherein one end thereof is axially coupled with the rotary motor 11 and the other end thereof is hinged to the mirror M allowing the mirror M to tilt.

Accordingly, the rotating force generated by the rotary motor 11 rotates the vertical rotary shaft 12 and the mirror M coupled with the vertical rotary shaft 12 while driving the gear unit 20, the cam members 30 and the tilt driving unit 40, provided between the mirror M and the rotary motor 11, to thereby tilt the mirror M.

In the meantime, the gear unit 20 changes the direction of the rotating force from the rotation driving unit 10 to rotate the cam members 30, thereby driving the tilt driving unit 40.

As shown in FIG. 3, the gear unit 20 includes a first gear 21 and a pair of second gears 22, in which gear teeth cut on conically-shaped gear bodies are in mesh at 90 degrees.

The first gear 21 is fitted onto the vertical rotary shaft 12 of the rotation driving unit 10 so as to coaxially rotate along with the vertical rotary shaft 12 by the rotating force of the rotary motor 11.

The second gears 22 are in mesh with the first gear 21 at substantially 90 degrees. Thus, each of the second gears 22 meshed with the first gear 21 rotates on a horizontal rotary shaft 23 extending perpendicular to the vertical axis of rotation of the first gear 21.

Since the second gears are in mesh with the first gear at the right angle, the rotating force from the rotary motor 11 can be transmitted along the horizontal rotary shafts 23 extending perpendicular to the vertical rotary shaft 12.

The gear unit 20 can preferably be implemented with bevel gears.

In addition, the gear unit 20 also includes one or more supports 24 through which the horizontal rotary shafts 23 extend such that the second gears 22 can rotate in mesh with the first gear 21.

While the two second gears 22 are meshed with both sides of the first gear 21 and are supported by the supports 24 according to the description of this embodiment of the invention, this is not intended to be limiting. Rather, the number of the second gears 22 can be one or more than two.

In the meantime, each of the cam members 30 is coupled with the gear unit 20 via a shaft on which the cam member 30 is mounted. The cam members 30 are rotated by the rotating force transmitted via the gear unit 20, thereby reciprocally raising and lowering the tilt driving unit 40 in the vertical direction.

As shown in FIGS. 1 through 3, each of the cam members 30 is configured as a circular or elliptical plate structure of a predetermined thickness.

The cam member 30 is axially connected with the second gear 22 via the horizontal rotary shaft 23 on which the cam member 30 is mounted so as to rotate following the rotation of the second gear 22.

Specifically, the horizontal rotary shaft 23 is connected at one end thereof with the second gear 22 and at the other end thereof with the cam member 30, and is supported by the support 24 such that the second gear 22 and the cam member 30 can rotate on the horizontal rotary shaft 23.

The cam member 30 can be shaft-connected with the horizontal rotary shaft 23 of the gear unit 20 such that the center of rotation is not identical with but is eccentric to the center of the cam member 30.

When the cam member 30 rotates on the horizontal rotary shaft 23 as the center of rotation, a radius of rotation (i.e., a shorter radius) defined by a first radius L1 from the horizontal rotary shaft 23 differs from a radius of rotation (i.e., a longer radius) defined by a second radius L2 from the horizontal rotary shaft 23. This difference in radius corresponds to the difference in length between the first radius and the second radius.

The difference in length corresponds to a vertical travel distance of the tilt driving unit 40, which will be described below.

In the tilt driving unit 40, the underside surface is in surface contact with the cam member 30. The tilt driving unit 40 is caused to vertically reciprocate by rotation of the cam member 30, thereby driving the mirror M to tilt.

As shown in FIGS. 4 and 5, the tilt driving unit 40 includes a vertically movable frame 41, a rotary frame 42 and a rod 46 of a predetermined length.

The vertically movable frame 41 is driven to vertically reciprocate by the cam member 30, which is placed under the vertically movable frame 41, and has a central opening 43 of a predetermined size in the central portion thereof.

The rotary frame 42 is received inside the central opening 43 of the vertically movable frame 41 and is rotatably coupled with the vertically movable frame 41. The rotary frame 42 has a through-hole 44 in the central portion thereof, through which the gear unit 20 can pass.

The tilt driving unit 40 has guide shafts 45 on the outer circumference of the vertically movable frame 41 to guide the vertically movable frame 41 to vertically reciprocate along a predetermined track.

While the vertically movable frame 41 and the through-hole 44 have a circular shape according to the description of the exemplary embodiment of the invention, this is not intended to be limiting. Rather, the vertically movable frame 41 and the through-hole 44 can have a variety of shapes such as a quadrangle.

The through-hole 44 can also be located in the central portion of the vertically movable frame 41, with the size thereof being smaller than that of the central opening 43.

In addition, a bearing can be provided between the rotary frame 42 and the vertically movable frame 41 such that the rotary frame 42 received inside the central opening 43 can smoothly rotate inside the vertically movable frame 41.

The rod 46 is a link member having one end hinged to the rotary frame 42 and the other end hinged to the mirror M.

Below, with reference to FIG. 6, a description will be given of a structure that allows the mirror to rotate and tilt according to the invention.

Figure 6A:
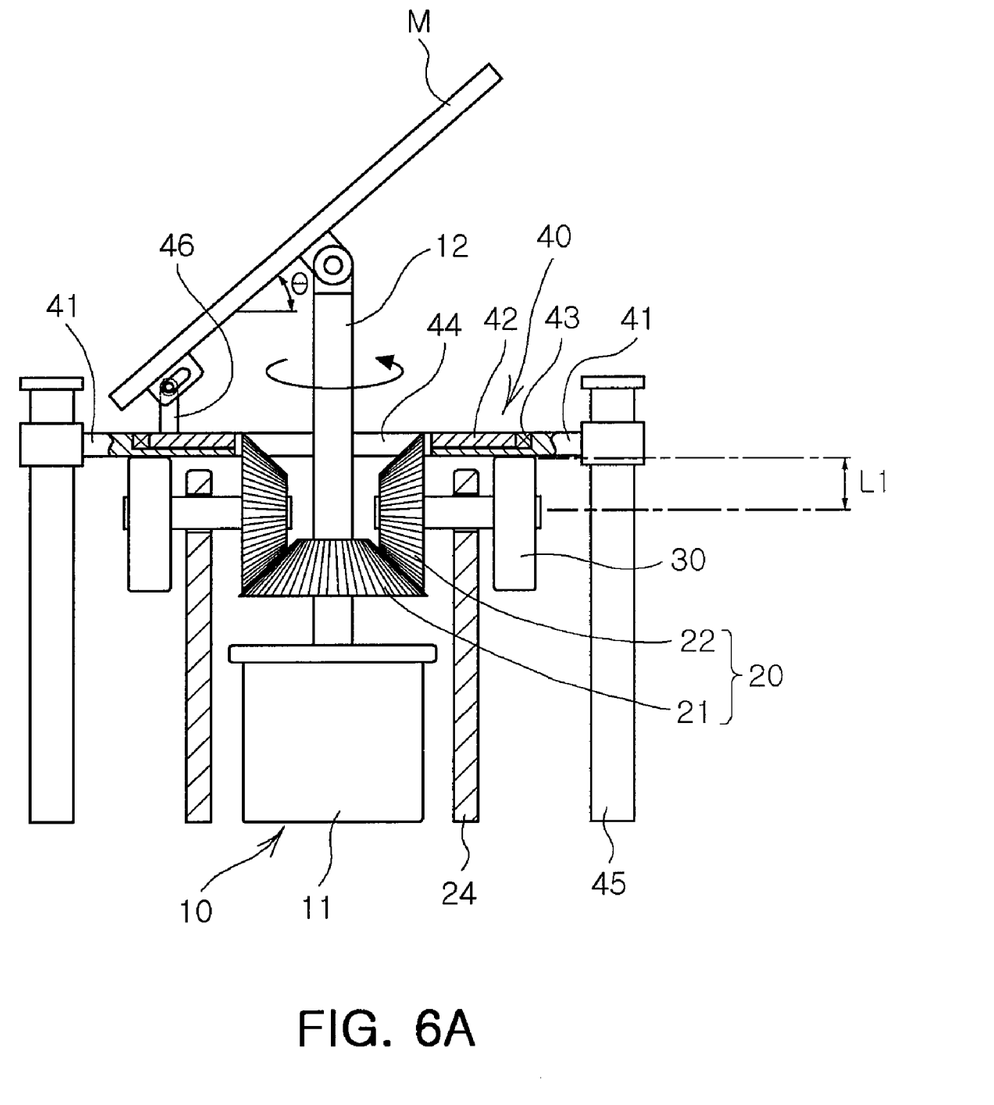
FIGS. 6A through 6C are schematic views illustrating respective operation stages of the space scanner for an autonomous mobile device shown in FIG. 1.
Figure 6B:
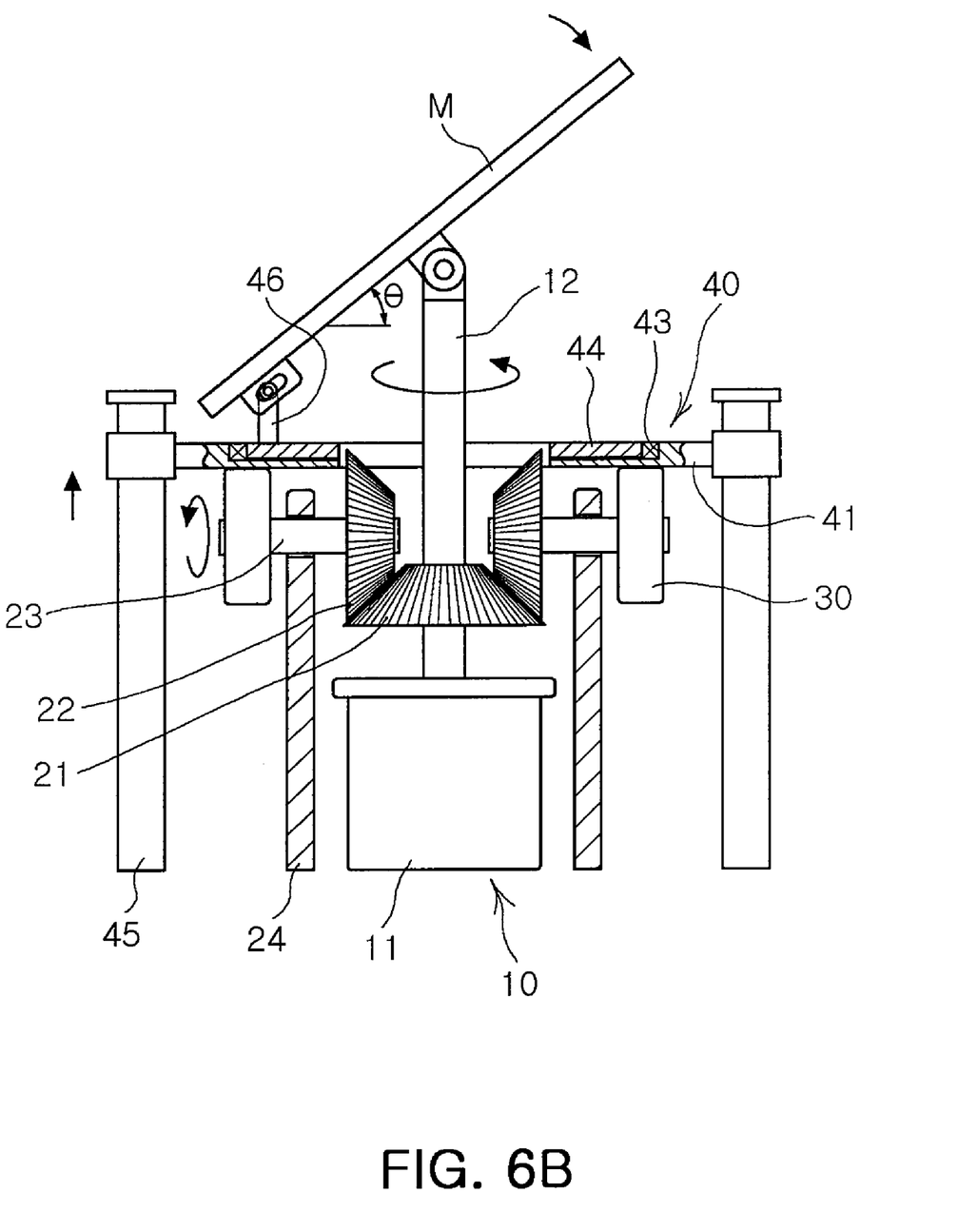
Figure 6C:
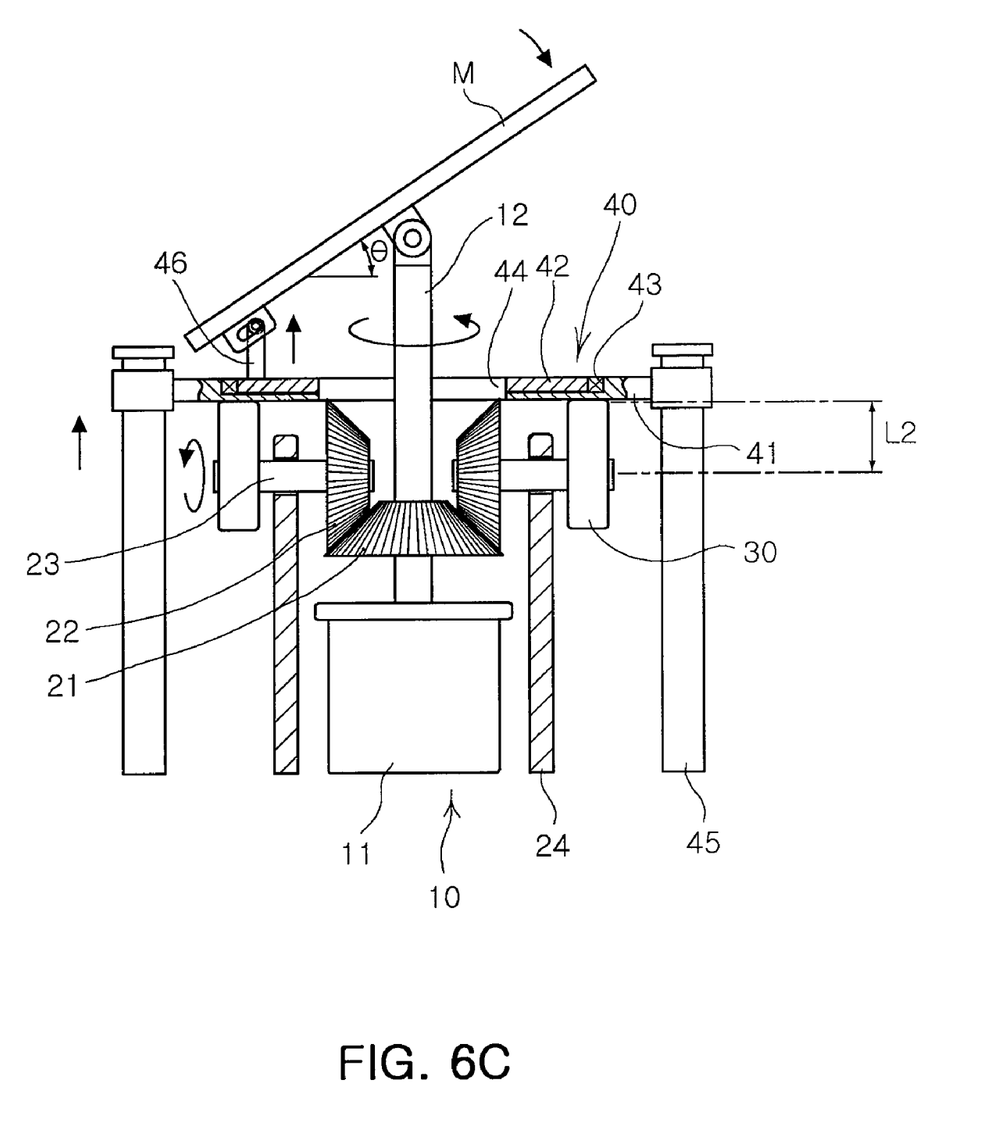

FIGS. 6A through 6C are schematic views illustrating respective operation stages of the space scanner for an autonomous mobile device shown in FIG. 1.

As shown in FIG. 6A, when the vertically movable frame 41 is in surface contact with the cam member 30 at the height (length) of the first radius (L1) of the cam member 30, the tilt driving unit 40 is located at the lowest position.

The mirror M is then pulled directly downwards by the rod 46 such that the inclination θ of the mirror M becomes 45 degrees or more with respect to the horizon.

Then, as shown in FIG. 6B, when the cam member 30 is rotated to the extent that the vertically movable frame 41 comes into surface contact with the cam member 30 at the middle height (length) between the first radius (L1) and the second radius (L2), the tilt driving unit 40 is located at the middle height.

In this case, the mirror M is pushed directly upwards by the rod 46 such that the inclination θ of the mirror M becomes about 45 degrees with respect to the horizon.

Next, as shown in FIG. 6C, when the cam member 30 is rotated to the extent that the vertically rotatable frame 41 is in surface contact with the cam member 30 at the height (length) of the second radius (L2) of the cam member 30, the tilt driving unit 40 is located at the highest position.

In this case, the mirror M is pushed directly upwards by the rod 46 such that the inclination θ of the mirror M becomes 45 degrees or less with respect to the horizon.

The tilting motion of the mirror M is repeated as the cam mirror 30 continues to rotate in the range expressed by the following relation: 0<θ<90. The range of the inclination θ can be adjusted by changing the length of the rod 46.

Furthermore, the rotation of the mirror M can be equally carried out as the vertical rotary shaft 12 continues to rotate.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A space scanner for an autonomous mobile device comprising:
   a rotation driving unit;
   a mirror coupled with the rotation driving unit so as to tilt with respect thereto;
   a gear unit converting direction of a rotating force from the rotation driving unit;
   a cam member coupled with the gear unit via a shaft on which the cam member is mounted such that the center of rotation is eccentric with the center of the cam member, the cam member rotating by the rotating force transmitted via the gear unit; and
   a tilt driving unit having an underside surface performing surface contact with the cam member, wherein the tilt driving unit vertically reciprocates by rotation of the cam member to tilt the mirror.

2. The space scanner of claim 1, wherein the rotation driving unit includes:
   a rotary electric motor; and
   a vertical rotary shaft having one end axially coupled with the rotary electric motor and the other end hinged to the mirror.

3. The space scanner of claim 1, wherein the gear unit includes:
   a first gear rotating by the rotating force from the rotation driving unit; and
   at least one second gear meshed with the first gear to rotate on a horizontal rotary shaft, which extends perpendicular to a vertical center of rotation of the first gear.

4. The space scanner of claim 3, wherein the gear unit further includes at least one support through which the horizontal rotary shaft extends, wherein the support is coupled with the horizontal rotary shaft to allow the second gear to rotate in mesh with the first gear.

5. The space scanner of claim 4, wherein the horizontal rotary shaft has one end connected to the second gear and the other end connected to the cam member, and is supported by the support.

6. The space scanner of claim 1, wherein the gear unit comprises bevel gears.

7. The space scanner of claim 1, wherein the cam member has a circular or elliptical shape.

8. The space scanner of claim 1, wherein the cam member is shaft-connected with the gear unit such that a center of rotation is eccentric to a center of the cam member.

9. The space scanner of claim 1, wherein the tilt driving unit includes:
   a vertically movable frame driven to vertically reciprocate by the cam member, which is placed under the vertically movable frame, wherein the vertically movable frame has a central opening of a predetermined size in a central portion thereof;
   a rotary frame having a through-hole of a predetermined size that allows the gear unit to pass through, wherein the rotary frame is received inside the central opening and is rotatably coupled with the vertically movable frame: and
   a rod having one end hinged to the rotary frame and the other end hinged to the mirror.

10. The space scanner of claim 9, wherein the tilt driving unit further includes a guide shaft guiding the vertically movable frame to vertically reciprocate.

* * * * *